United States Patent
Preisig

[11] 3,882,882
[45] May 13, 1975

[54] SYSTEM FOR METERING A SUBSTANCE INTO LIQUID FLOWING IN A CONDUIT

[75] Inventor: Jürg Preisig, Herisau, Switzerland

[73] Assignee: Dr. Wrede & Co., Standard-Messgerate Fabrikation, Werl, Germany

[22] Filed: Aug. 24, 1973

[21] Appl. No.: 391,160

[30] Foreign Application Priority Data
Aug. 26, 1972 Germany............................ 2242165

[52] U.S. Cl. ................... 137/98; 137/99; 137/565; 222/57; 222/334
[51] Int. Cl. ......................... B67d 5/08; G01f 11/08
[58] Field of Search ...... 137/98, 99, 565; 222/57 X, 222/334 X

[56] References Cited
UNITED STATES PATENTS

| | | | |
|---|---|---|---|
| 976,148 | 11/1910 | Caps | 137/99 |
| 1,999,881 | 4/1935 | Lowe | 137/99 |
| 2,009,622 | 7/1935 | Kennedy | 137/99 |
| 2,165,153 | 7/1939 | Pordie | 137/99 |
| 2,238,747 | 4/1941 | Ornstein | 137/99 |
| 2,289,332 | 7/1942 | Booth | 137/99 |
| 2,388,662 | 11/1945 | Anderson et al. | 222/334 X |
| 2,527,136 | 10/1950 | Kagi et al. | 222/57 X |
| 2,610,643 | 9/1952 | Goff | 137/99 |
| 3,010,404 | 11/1961 | Anderson | 137/99 X |
| 3,455,487 | 7/1969 | Crippen et al. | 222/334 X |

*Primary Examiner*—William R. Cline
*Assistant Examiner*—George L. Walton
*Attorney, Agent, or Firm*—Karl F. Ross; Herbert Dubno

[57] ABSTRACT

A flowmeter carries a cam disk which periodically operates a pivot valve that in turn actuates a pneumatic follower valve connected to a pump which for each actuation of the valves injects a predetermined quantity of a fluid additive into the conduit provided with the flowmeter. The pilot valve is operated by a lever which rides on the periphery of the cam disk and a reset mechanism is provided to displace the operating lever into the closed-valve position if the disk stops rotating and does not return the lever.

6 Claims, 6 Drawing Figures

SYSTEM FOR METERING A SUBSTANCE INTO LIQUID FLOWING IN A CONDUIT

FIELD OF THE INVENTION

The present invention relates to a system for introducing an additive into a liquid passing through a conduit. More particularly this invention concerns an apparatus for and a method of dosing a liquid with a pumped additive accurately according to quantity as it flows in a conduit.

BACKGROUND OF THE INVENTION

When a powder or liquid is to be added to another fluid which is flowing in a conduit, such as water which is to be dosed with a purifying agent (e.g., chlorine-releasing substances), it is usually required to maintain a rather strict proportion of the additive to the flowing fluid.

In a known system the flowing fluid is periodically allowed to pass through a branch conduit where it flows over and dissolves some of the additive, then flows back into the main stream. Such a system is often highly inaccurate as the rate at which the additive goes into solution depends on many factors, such as temperature, particle size, residence time, and the like.

Another system has a flow meter which periodically operates a valve to inject the additive under pressure into the main stream. Such a system has the disadvantage that if the flow meter happens to stop when the injecting valve is actuated, as for instance happens if the water flow stops at that instant, an excessive quantity of the additive is introduced into the stream.

It is also known to use such a flow meter to operate an electrical switch which in turn electrically operates a solenoid to inject a predetermined quantity of the additive into the flow. Such an arrangement can meter the additive into the flow line very accurately and can be protected from injecting an excessive quantity into this line, but this is often quite complicated. Failure of any of the electric components (which are failure-prone) renders such a system completely inoperative. Similarly, failure of the source of electric power also makes the arrangement inoperative.

OBJECTS OF THE INVENTION

It is therefore an object of the present invention to provide an improved system for introducing an additive into a stream of fluid in a conduit.

Another object of the invention is the provision of such a system which accurately meters an additive into the stream and which overcomes the abovementioned disadvantages.

SUMMARY OF THE INVENTION

The objects are attained according to the present invention in a system wherein the stream of fluid operates a flow meter connected to a pneumatic valve. A source of compressed gas is connected through the valve to a dosing pump which for each actuation of the valve forces a predetermined quantity of the additive into the stream. Such an arrangement is relatively simple and capable of functioning for long periods without any need for servicing.

According to another feature of this invention the dosing pump is connected to a source of pressurized gas through a follower valve operated by a pilot valve which is in turn actuated by a mechanism on the flow meter. The pilot valve is of the membrane type having a 0.1 mm diameter aperture, and the flow meter can be of the nutating-disk type or of the ring-piston or vane-pump type.

In accordance with yet another feature of the present invention means is provided which automatically resets the pilot valve after the dosing operation if for some reason the flow meter no longer moves. The flow meter is provided with a cam disk which coacts with a follower that operates the pilot valve. Should the flow be stopped just when the follower drops into the appropriate groove or rides up on a lobe of the cam, then the reset mechanism automatically returns the pilot valve to the closed condition so as to prevent undue pressure loss. This reset mechanism can comprise a lever arrangement and an actuator which are set by the cam only to be effective on the operating element of the pilot valve when this actuator is against that portion of the cam corresponding to an actuated position of the pilot valve.

Alternatively, according to this invention, the dosing pump is a membrane pump of the type hitherto used as a fuel pump for a conventional internal-combustion engine of an automobile and is spring loaded. A pressure head is built up on one side of the membrane to hold the spring normally back. The valve operated by the flow meter bleeds this pressure head off to the atmosphere so as to allow the spring to pump a charge of the additive into the fluid stream.

DESCRIPTION OF THE DRAWING

The above and other objects, features and advantages of the present invention will become more readily apparent from the following description, reference being made to the accompanying drawing in which:

FIG. 4 is a schematic view of a detail of an alternative embodiment of the present invention.

SPECIFIC DESCRIPTION

Figure 1:
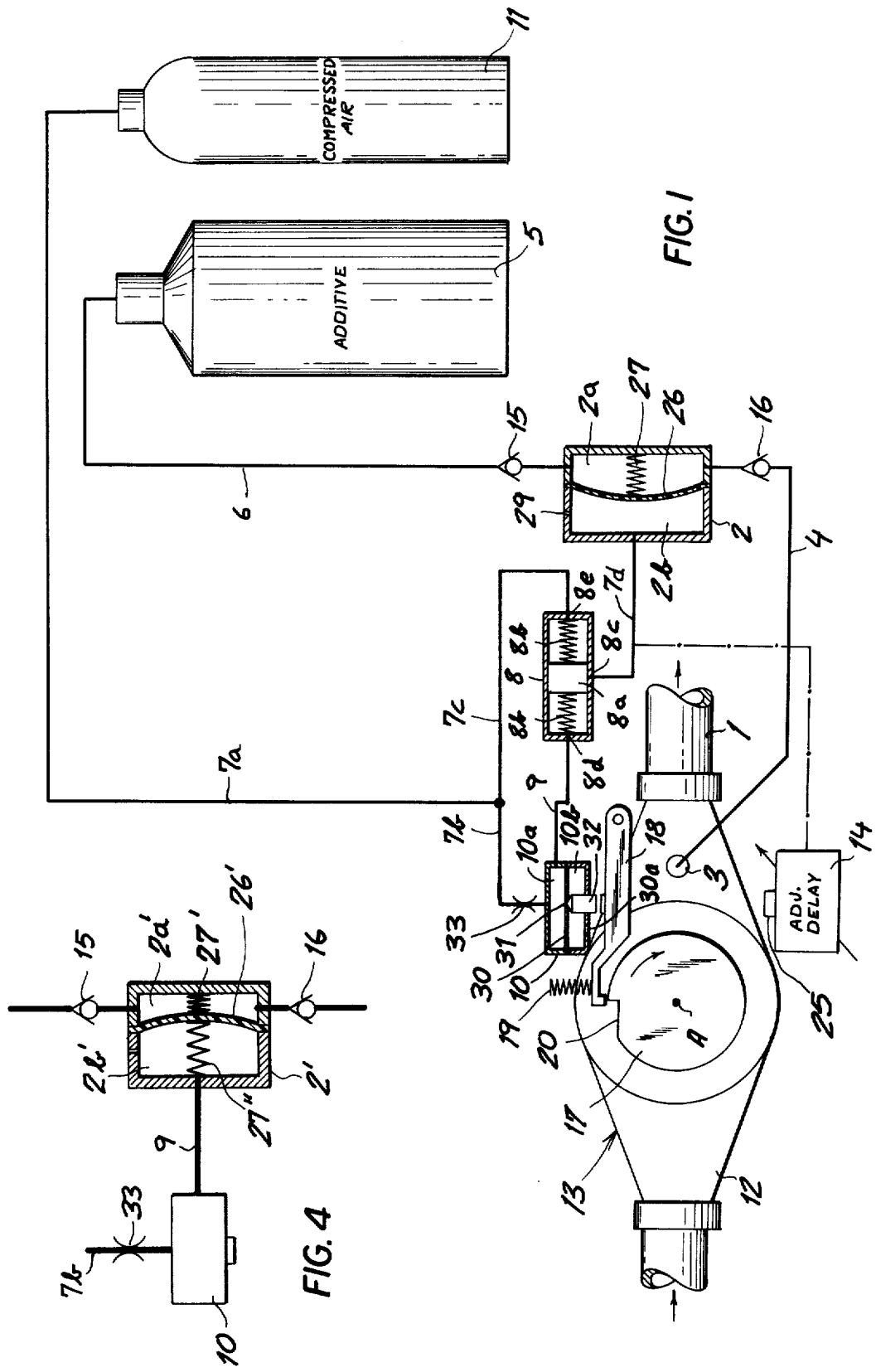
FIG. 1 is a largely schematic view of the system according to the present invention.

As shown in FIG. 1 a stream of water flows from left to right through a conduit 1 which is provided with a nutating-disk flowmeter 12. A liquid additive from a supply 5 is drawn through a tube 6 and forced by a membrane-type pump 2 through another tube 4 to a location 3 slightly downstream of the meter 12.

This pump 2 has a membrane 26 which is biased to the left by a spring 27 and which subdivides the interior of the pump 2 into a pumping chamber 2a and an operating chamber 2b. The latter chamber 2b is vented to the atomsphere through a pinpoint orifice 29.

Compressed gas from a bottle 11 or air from a compressor or the like is passed through a follower valve 8 to the operating chamber 2b. A check valve 15 of the ball type in the line 6 permits fluid flow into the chamber 2a and a similar one-way vlave 16 in the line 4 only permits fluid flow therefrom, so that pressurization of the chamber 2b with a gas forces a charge of additive into the fluid stream in conduit 1.

The air passes from the bottle 11 through a conduit 7a which branches into a conduit 7b leading to a pilot valve 10 and into a conduit 7c which goes to the follower valve 8, whence the air passes through a conduit 7d to the chamber 2b. The follower valve 8 is of the type which has three ports and which, when two of the ports are connected to sources of equal pressure, has no flow out the third port but, when one of the pressures at its inlet ports rises above the other, allows fluid to flow through it from the port of higher pressure to the outlet port. The illustrated follower valve has a piston 8a which is centrally biased by a pair of springs 8b to cover the outlet port 8c. The chambers to either side of the piston 8a are pressurized through inlet ports 8d and 8e, the former being connected through a line 9 to the pilot valve 10 and the latter being connected directly to the feed line 7c.

The pilot valve 10 has a chamber 10a to which are connected the lines 9 and 7b, the latter being provided with a restriction 33 smaller than 0.1 mm in diameter. A membrane 30 separates this chamber 10a from another chamber 10b vented through a hole 30a to the atmosphere. The membrane 30 is formed with a pinpoint aperture 31 having a diameter of 0.1 mm which is blockable by the pointed end of a valve operating element 32. Thus when the valve body 32 is pulled away from the membrane 9 the chamber 10a will depressurize through the orifice 30a, thereby depressurizing the line 9 and allowing the pressure to the right of the piston 8a to force this piston to the left and pressurize the chamber 2b. When the orifice 31 is blocked the pressure will build up in the chamber 10a and will slowly force the piston 8a back over the outlet hole 8c. Once fluid flow through line 7d is stopped the chamber 2b will slowly depressurize through the hole 29 and the pump chamber 2a will refill with the additive fluid.

Figure 2:
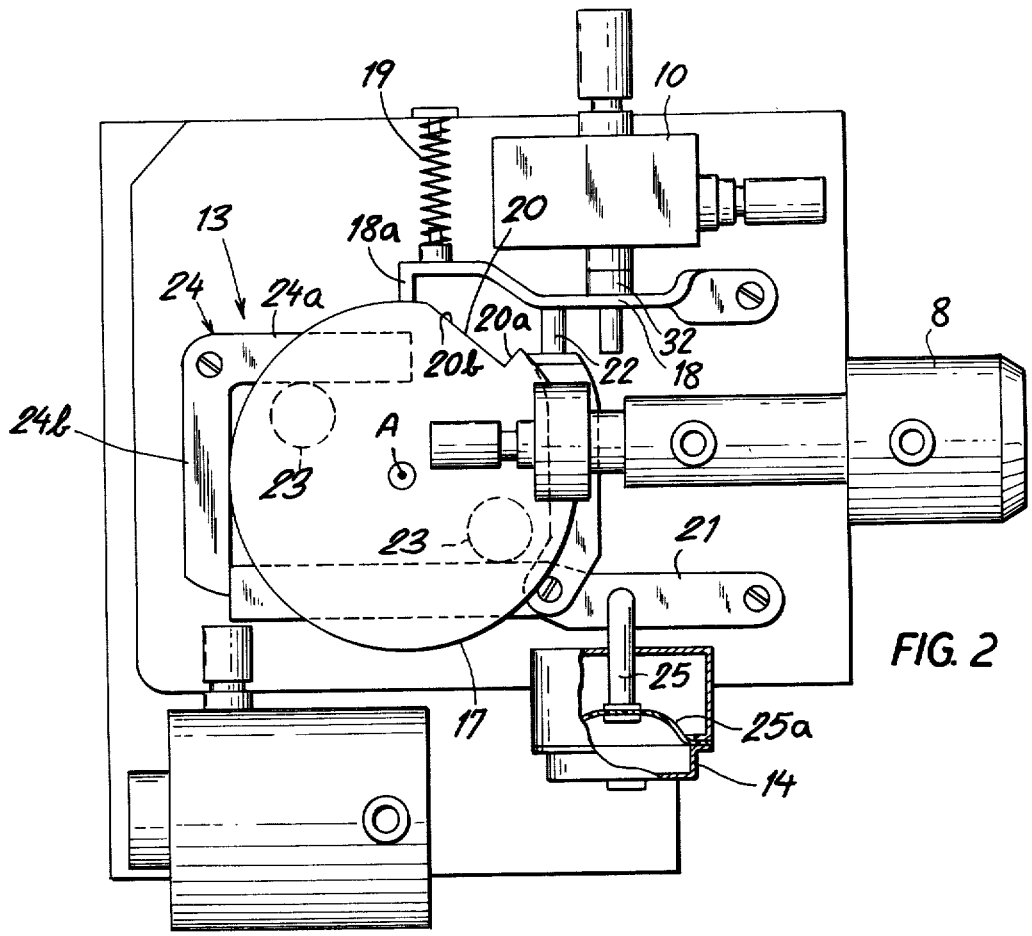
FIG. 2 is a view in enlarged scale of a detail of FIG. 1.

The valve body 32 is operated by a follower arm or lever 18 which, as shown in FIG. 2, is pivoted on the meter 12 and has an end 18a which engages a wheel or cam disk 17 which is rotated about its axis A by the flowmeter 12. The follower arm or lever 18 is biased by a spring 19 in a direction to allow the body 32 to uncover the hole 31. The disk 17 rotates at an angular speed directly proportional to the volume of water flowing through the meter 12, since this meter 12 is effectively a positive-displacement pump being operated as a motor. A straight-sided notch 20 formed on the periphery of the wheel or cam disk 17 has a radial leading side 20a and a chordal side 20b generally at a right angle thereto. It should be clear that when the follower end 18a drops over the edge 20a the valve body 32 will fall to depressurize the chamber 10a and operate the pump 2 as described above. Thus each revolution of the wheel or cam disk 17, which corresponds to a predetermined quantity of fluid flowing through the meter 12, will generate a mechanical output that in turn will cause a predetermined quantity of additive to be injected into the conduit 1 at 3. More than one such notch 20 can be provided on the wheel or cam disk 17 and radial protrusions or lobes can be provided to operate an arm fulcrumed to work as a third-class lever. Should the wheel or cam disk 17 stop rotating just when the follower arm or lever 18 is in the position corresponding to an unblocked condition of the hole 31 the pump 2 will still only effect one injection of the additive into the fluid stream since it will merely remain biased against its spring.

FIG. 4 shows an alternative embodiment wherein the line 9 is connected to an operating chamber 2b' of a pump 2' which is similar to the pump 2 except that it has a pair of springs 27' and 27" which are effective when the valve 10 is open to push the diaphragm 26' to the left, toward the operating chamber 2b', and when the valve 10 is closed to the right, toward the pumping chamber 2a'. Thus when the valve 10 is opened the pump 2' draws in a charge of additive through the valve 15 and when the valve is again closed and pressure builds up in the line 9 it expels this charge through the valve 16 and line 4.

In order to prevent the bottle from being completely depleted as a result of the follower arm or lever 18 resting for a long period of time in the notch 20 and the air escaping through the hole 31, the reset mechanism 13 is provided which automatically returns the element 32 to the closed position after a predetermined time should the wheel or cam disk 17 not lift it. This is the circumstance described above where for some reason the flow of water through conduit 1 is stopped just after the end 18a falls over the edge 20a.

This reset mechanism 13 comprises a reset actuator 14 having a piston 25 displaceable by a membrane 25a to operate on a second-class lever 21 pivoted on the housing and on which is pivoted a link 22 which can push up against the arm or lever 18. The wheel or cam disk 17 carries a pair of axially protruding formations 23 of rod shape which coact with the lever 21 and with a two-arm lever 24 having one arm 24a engageable by the end 18a and another arm which can engage over the end of the lever 21.

Figure 3A:
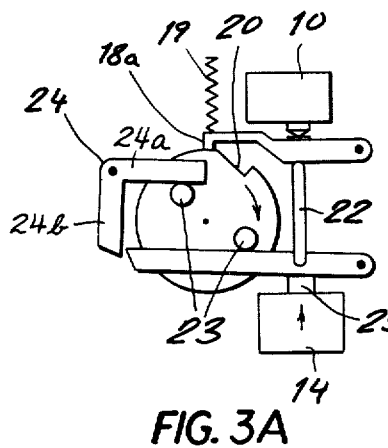
FIGS. 3A – 3C are schematic views illustrating three consecutive positions of the elements of the system according to this invention.
Figure 3B:
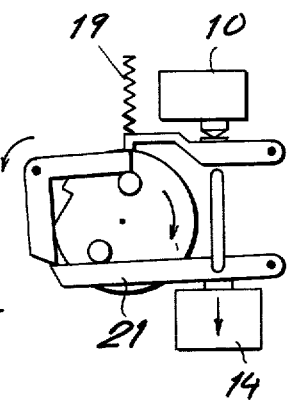
Figure 3C:
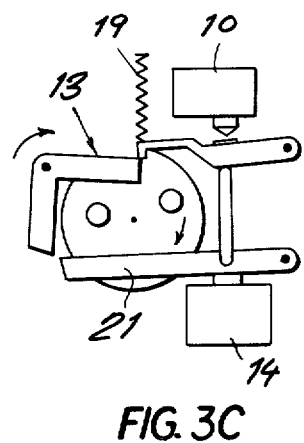

FIG. 3A shows how the formations 23 push the arm 24a up and push the lever 21 down so that the arm 24b catches on the lever 21 and prevents it from lifting, thereby holding the link 22 away from follower arm or the lever 18 as shown in FIG. 3B. When the follower arm or lever 18 drops into the notch 20 it engages the free end of the arm 24a and pivots the arm 24b away from the lever 21, as shown in FIG. 3C, so that the piston 25 is then able to push on the link 22 and close the valve 10.

The reset actuator 14 exerts a force on the link 22 a short time after it is released by the lever 24. This can be effected by connecting the chamber behind the membrane 25a to the line 7d that also actuates the pump 2. Thus once the valves 10 and 8 have let enough pressure through to actuate this pump the same pressure serves to reset the valve 10 and prevent further loss of pressure through the hole 31. Other arrangements which store the pressure exerted on the piston 25 by the lever 21 and release it after a brief time, long enough for the pump 2 to be pressurized and actuated, are similarly employable.

All of the various membranes and seals are made of a temperature-resistant synthetic resin so that the device is operative in a wide temperature range. The amount of compressed gas required is dependent on the amount of additive, so that the bottle 11 may be changed each time the additive reservoir 5 is refilled or replaced. The stroke of the pump 2 and the rate of rotation of the flowmeter per unit volume of fluid determine the dosing percentage, these factors being easily adjustable by use of the appropriate elements.

I claim:
1. A system for introducing an additive into fluid passing through a conduit, siad system comprising:
flowmeter means in said conduit having an operating element which rotates at a rate proportional to vol- ume rate of fluid flow in said conduit for generating a periodic output having a frequency proportional to said volume rate of flow;

pneumatically operable pump means connected to a source of said additive and including a fluid line connected to said conduit for injecting a predetermined quantity of said additive into said conduit through said fluid line;

valve means including a pilot valve connected to said flowmeter means and to said source of pressurized gas and a follower valve connected to said pilot valve, to said source of pressurized gas and to said pump means for pneumatically operating said pump means each time said flowmeter means generates an output, said pilot valve having a membrane formed with a pinpoint orifice; and reset means connected to said valve means for closing said follower valve and thereby halting operating of said pump after a predetermined period of said operating element being in a position wherein said flowmeter means generates an output.

2. The system defined in claim 1 wherein said operating element is a cam disk and said valve means includes a cam follower engaging said disk.

3. The system defined in claim 1 wherein said pump means has a housing, a pneumatically displaceable membrane subdividing said housing in a pair of chambers, a check valve opening into one of said chambers and connected to said source of said additive for allowing flow into said one chamber and another check valve opening into said one chamber and connected to said line for allowing flow from said one chamber, the other chamber being connectable through said valve means to said source of pressurized gas.

4. The system defined in claim 1 wherein said valve means includes an actuating element connected to said flowmeter means and displaceable between a first position corresponding to an actuated condition of said pump and a second position corresponding to a nonactuated condition of said pump, said flowmeter means further comprising a cam rotatable at a rate proportional to volume rate of flow of said fluid in said conduit, said actuating element engaging said cam and being displaceable thereby between said first and second positions, said reset means including an actuator engageable with said actuating element for displacing same from said first to said second position, and means for preventing engagement of said actuator with said actuating element except in a position of said cam corresponding to said first position.

5. The system defined in claim 4 wherein said cam is a cam disk having a noncircular periphery engaged by said actuating element.

6. The system defined in claim 4 wherein said means for preventing engagement includes formation on said cam operatively connectable with said actuator.

* * * * *